Aug. 22, 1933.  C. E. GABLE  1,923,432
BRAKE DRUM AND APRON
Filed Aug. 22, 1930

Inventor
Charles E. Gable,
By Justin W. Macklin
His Attorney

Patented Aug. 22, 1933

1,923,432

UNITED STATES PATENT OFFICE 1,923,432

BRAKE DRUM AND APRON

Charles E. Gable, Detroit, Mich., assignor to The Midland Steel Products Company, Cleveland, Ohio, a Corporation of Ohio Application August 22, 1930. Serial No. 476,985

7 Claims. (Cl. 188—218)

This invention relates to brakes for automobiles and other vehicles, and is particularly concerned with a stamped metal brake drum and apron for internal expanding brakes.

Heretofore in the manufacture of stamped metal brake drums and aprons for such brakes, it has been difficult to form the apron and drum so that the brake shoe will be supported in proper axial position in the drum, and so that a smooth and even braking surface of the drum will be presented to the fabric brake lining for the full width thereof. In brakes of the internal expanding type there is a tendency for the shoe to move out of the drum towards the apron. Unless the brake shoe is held in place by contact of a substantial amount of its edge with the apron, it tends to ride over the apron, becoming noisy and wearing badly.

In the generally used type of drum, the inner edge of the drum adjacent to the apron is flanged outwardly at 90° from the axis of the drum, and the outer edge of this flange is bent back inwardly 90° from the flange forming an internal annular shoulder of greater diameter than the drum and coaxial therewith. The apron is likewise bent inwardly away from the drum at an abrupt angle so as to form a complementary external annular shoulder. However, due to the thickness of the metal, the bend between the inner or braking surface of the drum and the flanged portion is of a comparatively large radius and drops radially outwardly from the braking surface. Likewise, the complementary bend on the apron falls away axially inwardly from the plane of the main body of the apron and thus away from the edge of the brake shoe. As a result the inner surface of the apron engages only a small portion of the edge of the brake shoe and the shoe partially overhangs the rounded annular edge of the apron. Also, the fabric lining tends to overhang the rounded annular edge of the inner or braking surface of the drum.

Another difficulty encountered in the manufacture of such brakes resides in the fact that in turning back the large flange at a right angle to the plane of the metal, a heavy impact is required. This tends to upset the metal adjacent to the bend, thus thickening part of the drum near the bend and causing an inward slope on the fabric contacting surface of the drum. Uneven braking pressure across the drum with resultant excessive wear on portions of the lining results. Further, foreign matter tends to lodge on the surface thus formed, due to centrifugal force.

One of the objects of our invention, therefore, is a stamped metal brake drum and apron which will retain the brake shoe in proper position and eliminate any tendency of the shoe to ride out from the drum.

Another object of our invention is a drum and apron in which an even, smooth surface is presented to the brake lining across its entire width.

Another object of our invention is to accomplish these results without increasing the overall dimensions of the drum and apron, relative to the present type of drums and aprons.

Still other objects of our invention are a drum and apron each formed of a single piece of metal and each rigid enough to withstand all the usual stresses to which such are subjected while in use.

Another object is such a drum and apron in which the working parts of the brake are effectively protected from foreign matter.

Another object of our invention is a brake drum and apron which lends itself to economic production in large or small quantities and from readily obtainable materials.

Other objects and advantages will become apparent from the following specification in which reference is made to the drawing.

In the drawing—

Figure 2:
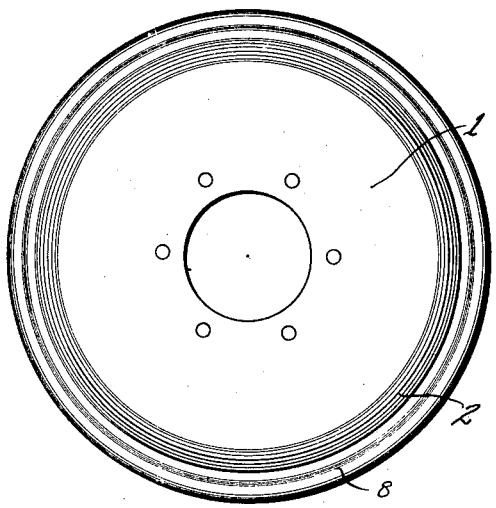
Fig. 2 is a plan view on a reduced scale of the drum illustrated in Fig. 1.
Figure 3:
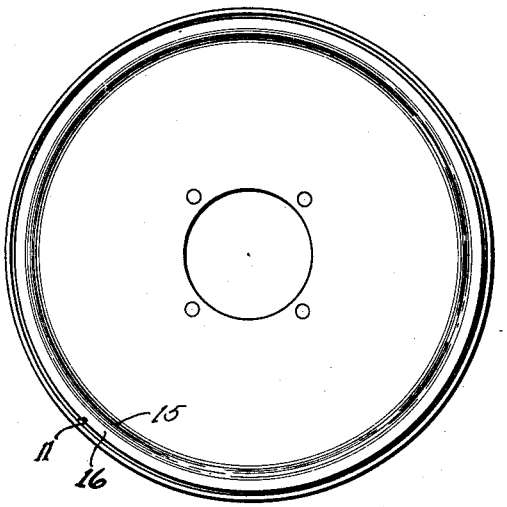
Fig. 3 is a reduced scale plan view of the apron illustrated in Fig. 1.
Figure 1:
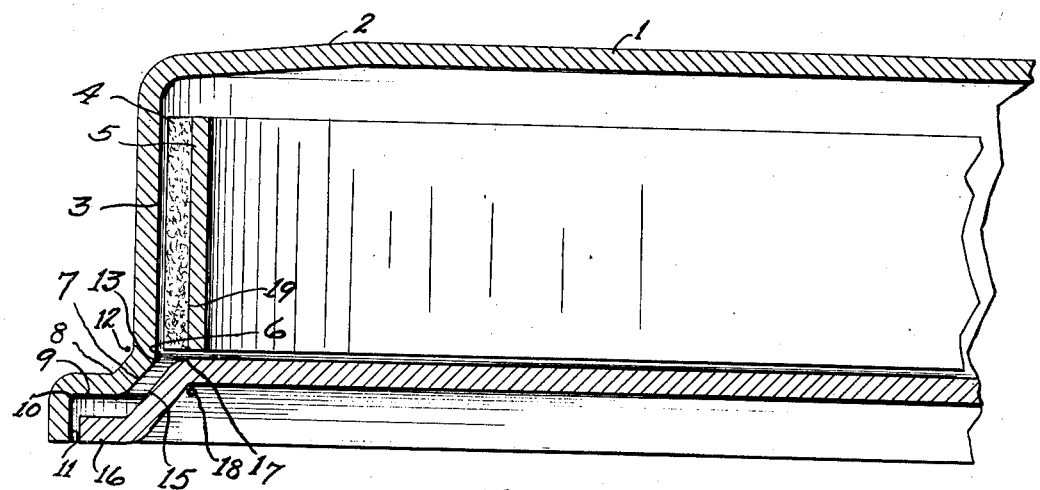
Fig. 1 is a partial sectional view through a brake drum and apron embodying the principles of our invention.

A preferred form of our invention, as illustrated, includes a brake drum 1 preferably formed from a single piece of material of the required gage by stamping or rolling. The outer face of the drum is bent inwardly a slight amount as at 2 for increased strength and rigidity and to accommodate a widened spoke. This deflected portion terminates in an annular shoulder or drum 3 normal to the outer face 1. The inner surface of this drum forms the brake contacting surface for the brake lining 4, which is operated by the brake shoe 5. The drum 3 extends as a cylinder from the face 1 to or slightly past the inner edge of the lining 4 and brake shoe 5, as indicated at 6. At this point it is bent back, preferably at an angle of 45°, forming an outwardly sloping annular shoulder 7. This shoulder, the width of which is a small proportion of the width of the drum, is then deflected another 45°, as at 8, to bring the portion 9 parallel to the surface 1.

The remainder of the metal is then turned at right angles to the portion 9, as at 10, forming a small annular shoulder 11 concentric with the drum 3. Due to the fact that a 45° bend requires much less force than a 90° bend, the tendency of the metal to upset at the point 6 is almost eliminated. As a result, the metal of the drum 3 is not upset and thickened and the inner surface of the drum 3 is of the same radius across its entire width.

Likewise, the metal is not stressed so heavily and the curve does not extend as far back onto the inner surface of the drum 3. The center of the bend 13 between the braking surface of the drum 3 and the shoulder 7 is preferably located near the plane of the inner edge of the shoe 5 and lining 4, as indicated at 12. By so locating the center and making only a 45° bend the curve surface does not extend back onto the braking surface. Thus the inner surface of the drum 3 is retained at the same thickness and radius for the full width of the lining 4, and the lining 4 does not overhang any curved portion of the drum 3.

The apron is preferably formed of a single sheet of metal stamped as illustrated. Toward the outer edge it is bent inwardly to form an annular sloping shoulder 15 complementary to the shoulder 7. It is then deflected in the opposite direction bringing the outer extremity 16 parallel to the main body of the apron. This outer portion 16 is of less diameter than the inner diameter of the shoulder 11, as illustrated, depending upon the amount of clearance desired between the drum and apron.

An important feature of our invention resides in the positioning of the bend 17 connecting the main body of the apron and the annular shoulder 15. The locus of the center, indicated at 18, of this bend is preferably positioned radially in the plane of or close to the outer surface 19 of the brake shoe 5, so that the flat surface of the apron is exposed to the edge of the shoe. Since the bend adjacent thereto is less abrupt than 90°, for instance, only 45°, as described, the bend on the outside of the apron adjacent the shoe does not extend toward the center of the apron past the center 18, but comes tangent to the inner surface of the apron in the plane of the surface 19, thus presenting a flat apron surface to the entire edge of the shoe 5.

By these changes we have provided a flat surface on the apron for contact with the edge of the braking shoe, which extends radially outwardly to the lining surface of the shoe, so that the shoe cannot ride over the apron or partially out from the drum. In like manner we have provided an inner contact surface in the drum 3, the radius of which is constant the full width of the brake shoe and lining. Consequently, the lining does not overhang the inner portion of the drum when the brake shoe is in contact with the apron. The drum and apron so formed coact first to hold the brake shoe 5 and lining well within the drum and in axial alignment with a smooth braking surface and to present a contact surface of constant radius to the lining for its full width.

It should be noted further in this connection that the metal is not subjected to the usual severe stresses which result from abrupt bends and therefore annealing or machine surfacing is eliminated. Furthermore, since the outward sloping shoulder 7 begins outside of the brake lining, any foreign matter thrown between the drum and apron is not caught and held on the annular braking surface of the drum 3, but is thrown outwardly along the sloping shoulder 7 by centrifugal force. Due to the tendency of liquids and fine particles of foreign matter to adhere to each other, the force imparted to the foreign matter by the shoulder 7 tends to draw with it any such matter which has passed into the drum.

While by way of illustration we have specified angles of deflection of 45°, this is merely the preferred deflection for economy in size and ease in removing from the dies, and other deflections less than 90° may be used with varying degrees of success.

I claim:

1. In an internal expanding brake, a brake drum having a shoe engaging portion and closure apron, a brake shoe operable within said drum, said drum being bent radially outwardly adjacent said apron to form an annular outwardly sloping shoulder at substantially 45 degrees to the shoe engaging portion, an annular portion of said apron being bent inwardly to form a complementary shoulder on said apron, the locus of the center of the bend of said drum being axially positioned near the plane of the inner edge of said brake shoe, and the surface of the bend of the apron lying no closer to the brake shoe than the inside surface of the apron.

2. In an internal expanding brake, a brake drum, a brake shoe within said drum, a closure apron therefor, a portion of said brake drum adjacent to said apron sloping radially outwardly from said drum with approximately 45° deflection, and forming an annular sloping shoulder, a complementary shoulder on said apron, the point of the beginning of the deflection of the shoulder on said drum lying axially outwardly from said apron and near to the plane of the adjacent edge of said brake shoe.

3. As an article of manufacture, a stamped metal brake drum and complementary apron for internal expanding brakes, characterized by the fact that a portion of the drum adjacent to the apron is deflected radially outwardly at an angle of substantially 45° to form an annular shoulder and the outer portion of the shoulder thus formed is deflected in the same direction through an angle complementary to the first mention angle, and a portion of said apron near the circumference is deflected axially away from said drum parallel to said annular shoulder, whereby the drum and apron may each be stamped without changing the wall thickness of the material adjacent the deflection.

4. A method of forming a drum and closure apron for internal expanding brakes, which includes deflecting a portion of said drum adjacent to the apron side radially outwardly through an angle of substantially 45° to form an annular sloping shoulder, deflecting the outer portion of said shoulder in the same direction through a complementary angle to bring said outer portion normal to said drum, bending the outer portion of said apron to form an annular shoulder complementary to the first mentioned shoulder and then bending a portion of this shoulder parallel to its original direction.

5. A brake drum having a shoe engaging annular portion normal to its outer face, the inner part of the annular portion being deflected radially outward at an angle of substantially 45° to the outer face of the drum and continuing in a radially outwardly extending part substantially parallel to the outer face of the drum to terminate in an axially projecting annular flange substantially parallel to the annular shoe engaging portion.

6. In an internal expanding brake, a brake drum, a brake shoe within said drum, a closure apron for the drum, said drum having a shoe engaging annular portion normal to its outer face, the inner part of the annular portion being deflected radially outward at an angle of substantially 45° to the outer face of the drum and continuing in a radially outwardly extending part substantially parallel to the outer face of the drum to terminate in an axially projecting annular flange substantially parallel to the annular shoe engaging portion, and a closure apron having its outer annular portion extended at substantially an angle of approximately 45° to parallel the correspondingly disposed portion of the drum and terminating in a flange extending outwardly in a plane substantially parallel to the plane of the apron whereby the inner surface of the outer annular portion of the apron prevents axial movement of the shoe and the flange of the apron is disposed within the confines of the annular edge flange of said drum.

7. A brake drum having an annular shoe engaging portion normal to its outer face, the inner part of said annular portion being bent and flanged radially outward at an angle of substantially 45 degrees to the outer face of the drum whereby the wall thickness of the shoe engaging portion adjacent said bend remains substantially constant and the entire inner shoe engaging surface of the shoe engaging portion is maintained of uniform diameter.

CHARLES E. GABLE.